US008200047B1

(12) United States Patent  
Kowalczyk (10) Patent No.: US 8,200,047 B1
(45) Date of Patent: Jun. 12, 2012

(54) TRUE TIME DELAY PHOTONIC CIRCUIT

(75) Inventor: Anthony C. Kowalczyk, San Carlos, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 72 days.

(21) Appl. No.: 12/466,338

(22) Filed: May 14, 2009

Related U.S. Application Data

(60) Provisional application No. 61/054,446, filed on May 19, 2008.

(51) Int. Cl.
  *G02F 1/01* (2006.01)
  *G02B 6/12* (2006.01)
  *G02B 6/26* (2006.01)
  *G02B 6/42* (2006.01)

(52) U.S. Cl. .............. 385/1; 385/14; 385/16; 385/46
(58) Field of Classification Search .......... 385/1, 14, 385/16, 20, 22, 37, 46
   See application file for complete search history.

(56) References Cited

U.S. PATENT DOCUMENTS

| | | | | |
|---|---|---|---|---|
| 5,367,586 A * | 11/1994 | Glance et al. | ................ | 385/24 |
| 5,542,010 A * | 7/1996 | Glance et al. | ................ | 385/14 |
| 5,701,372 A * | 12/1997 | Magel et al. | ................ | 385/24 |
| 5,793,907 A * | 8/1998 | Jalali et al. | ................ | 385/24 |
| 2005/0084266 A1* | 4/2005 | Pohjola et al. | ................ | 398/77 |
| 2009/0129779 A1* | 5/2009 | Bernasconi et al. | ................ | 398/79 |

OTHER PUBLICATIONS

"Recirculating photonic filter: a wavelength-selective time delay for phase-array antennas and wavelength code-division multiple access" by Yegnanarayanan et al, Optical Letters, vol. 21, No. 10, pp. 740-742, May 1996.*
"Wavelength-selective true time delay for optical control of phased-array antenna," by Yegnanarayanan et al, IEEE Photonics Technology Letters, vol. 12, No. 8, pp. 1049-1051, Aug. 2000.*
"Photonic integrated true-time-delay beamformers in InP technology," by Manuel Soares, Ph.D. thesis, 2006.*
"Multi-wavelength tunable fiber laser using SOA: application to fiber Bragg grating vibration sensor array," by Tanaka et al, IEEE Seonsors Conference, pp. 411-414, Oct. 2007.*

* cited by examiner

*Primary Examiner* — Charlie Peng
*Assistant Examiner* — Robert Tavlykaev
(74) *Attorney, Agent, or Firm* — McDermott Will & Emery LLP (57) ABSTRACT

Described are systems and methods that provide tunable true time delay of a signal using a compact photonic circuit. The photonic circuit comprises a plurality of waveguides, in which each waveguide corresponds to a different time delay. A particular one of the waveguides corresponding to a desired time delay is selected by tuning the wavelength of a tunable laser. Additional photonic circuits can be used to provide additional selectable time delays.

14 Claims, 9 Drawing Sheets

TRUE TIME DELAY PHOTONIC CIRCUIT

RELATED APPLICATION

The present application claims the benefit of priority under 35 U.S.C. §119 from U.S. Provisional Patent Application Ser. No. 61/054,446, entitled "TRUE TIME DELAY PHOTONIC CIRCUIT," filed on May 19, 2008, which is hereby incorporated by reference in its entirety for all purposes.

STATEMENT REGARDING FEDERALLY SPONSORED RESEARCH OR DEVELOPMENT

Not Applicable.

FIELD OF THE INVENTION

The present invention generally relates to photonic circuits and, in particularly, relates to true time delay photonic circuits.

BACKGROUND OF THE INVENTION

One approach to providing true time delay hardware involves using a plurality of low-loss fiber optic waveguides, in which the length of each fiber optic waveguide is configured to achieve a particular delay. A large N×M switch matrix is used to couple light into one of the fiber optic waveguides based on a desired time delay. While this approach is simple from the perspective of controlling fiber lengths, extreme burden is placed on design and fabrication of the switch matrix. Further, the switch matrix and fiber paths result in true time delay hardware having a large footprint and increased weight.

SUMMARY OF THE INVENTION

Described are systems and methods that provide tunable true time delay of a signal using a compact photonic circuit. The photonic circuit comprises a plurality of waveguides, in which each waveguide corresponds to a different time delay. A particular one of the waveguides corresponding to a desired time delay is selected by tuning the wavelength of a tunable laser. Additional photonic circuits can be used to provide additional selectable time delays.

In one aspect, a photonic circuit is provided. The photonic circuit comprises a plurality of waveguides, each of the plurality of waveguides having a different length corresponding to one of a plurality of different time delays. The photonic circuit further comprises a demultiplexer configured to couple an optical signal into one of the plurality of waveguides depending on a wavelength of the optical signal and a multiplexer configured to couple each of the plurality of waveguides to an output waveguide.

In one aspect, the plurality of waveguides, the demultiplexer and the multiplexer of the photonic circuit are integrated on a single substrate.

In one aspect a time delay system is provided. The time delay system comprises a tunable laser configured to produce an optical carrier signal having a tunable wavelength and an optical modulator configured to modulate an input signal onto the optical carrier signal to produce a modulated optical signal. The time delay system further comprises a photonic circuit configured to delay the modulated optical signal by one of a plurality of different time delays depending on the wavelength of the optical carrier signal and a delay controller configured to tune the wavelength of the optical carrier signal of the tunable laser based on a selected one of the plurality of time delays.

Additional features and advantages of the invention will be set forth in the description below, and in part will be apparent from the description, or may be learned by practice of the invention. The advantages of the invention will be realized and attained by the structure particularly pointed out in the written description and claims hereof as well as the appended drawings.

It is to be understood that both the foregoing summary of the invention and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate aspects of the invention and together with the description serve to explain the principles of the invention.

DETAILED DESCRIPTION OF THE INVENTION

In the following detailed description, numerous specific details are set forth to provide a full understanding of the present invention. It will be obvious, however, to one ordinarily skilled in the art that the present invention may be practiced without some of these specific details. In other instances, well-known structures and techniques have not been shown in detail to avoid obscuring concepts of the present invention.

Reference will now be made in detail to aspects of the subject technology, examples of which are illustrated in the accompanying drawings, wherein like reference numerals refer to like elements throughout.

Figure 1:
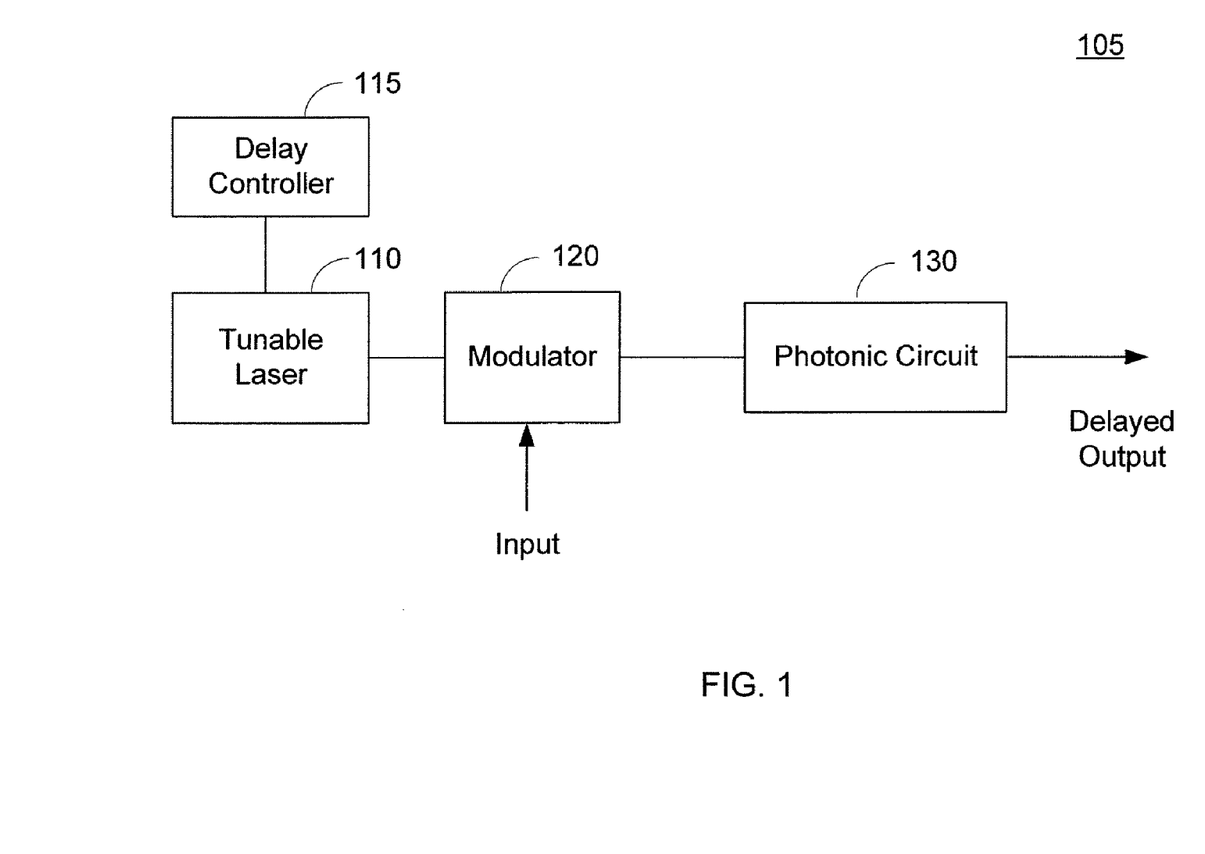
FIG. 1 is a diagram of a true time delay system according to an aspect of the present disclosure.

FIG. 1 illustrates a true time delay system 105 according to an aspect of the present disclosure. The true time delay system 105 comprises a tunable laser 110, a delay controller 115, an optical modulator 120, and a photonic circuit 130.

The tunable laser 110 is configured to produce an optical carrier signal having a tunable wavelength. The optical modulator 120 is configured to modulate an input signal onto the optical carrier signal producing a modulated optical signal. The input signal is the signal to be delayed by the true time delay system 105. The photonic circuit 130 is configured to delay the modulated optical signal, and hence the input signal modulated onto the optical carrier signal, by one of a plurality of different time delays depending on the wavelength of the optical carrier signal. In one aspect, the delay controller 115 is configured to control the time delay of the photonic circuit 130 by adjusting the wavelength of the tunable laser 110 to a wavelength that corresponds to a particular time delay of the photonic circuit 130. Thus, the true time delay system 105 provides adjustable time delay that is controlled by tuning the wavelength of the tunable laser 110.

The delayed output signal of the photonic circuit 130 may be converted to an electrical signal by a photo-receiver (not shown in FIG. 1). Further, the optical carrier can be removed from the delayed output signal of the photonic circuit 130 to recover the time delayed input signal.

Figure 2:
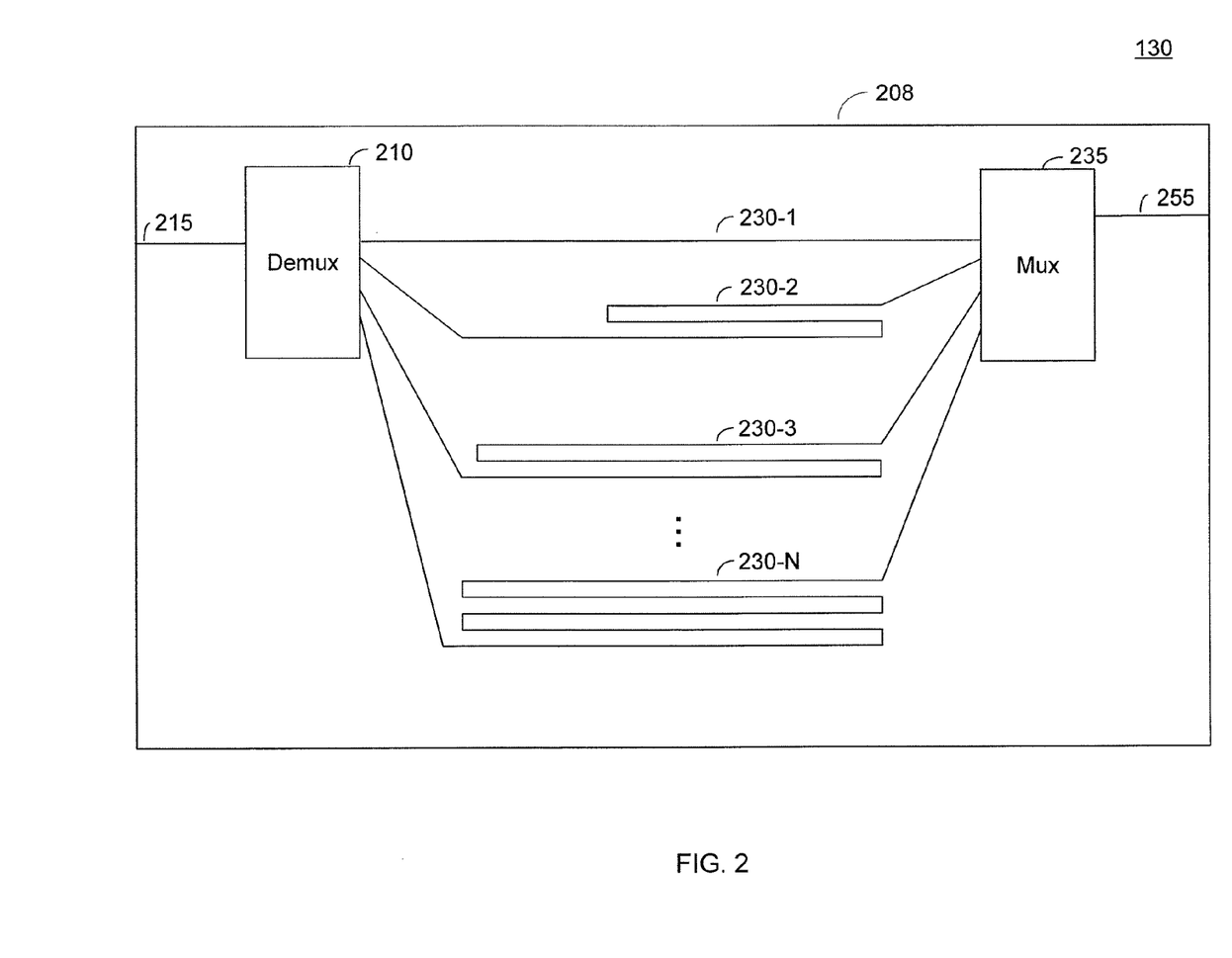
FIG. 2 is a diagram of a photonic circuit according to an aspect of the present disclosure.

FIG. 2 illustrates the photonic circuit 130 according to an aspect of the disclosure. The photonic circuit 130 comprises an input waveguide 215, a demultiplexer 210, a multiplexer 235, and an output waveguide 255. The photonic circuit 130 also comprises a plurality of waveguides 230-1 to 230-N coupled between the demultiplexer 210 and the multiplexer 235. The waveguides 230-1 to 230-N have different lengths corresponding to different time delays. Thus, the different waveguides 230-1 to 230-N provide different time delays, in which a particular one of the time delays can be selected by selecting the corresponding waveguide 230-1 to 230-N.

The input waveguide 215 is configured to receive the modulated optical signal from the optical modulator 120. The demultiplexer 210 is configured to couple the modulated optical signal into a particular one of the plurality of waveguides 230-1 to 230-N depending on the wavelength of the optical carrier signal. The multiplexer 235 is configured to couple each of the plurality of waveguides 230-1 to 230-N to the output waveguide 255, which outputs the delayed output signal of the photonic circuit 130.

Thus, the demultiplexer 210 couples the modulated optical signal into a particular one of the waveguides 230-1 to 230-N depending on the wavelength of the optical carrier signal. Since each of the plurality of waveguides 230-1 to 230-N corresponds to a particular time delay, the time delay of the photonic circuit 130 also depends on the wavelength of the optical carrier signal, and can therefore be controlled by tuning the wavelength of the tunable laser 110. In one aspect, the delay controller 115 selects a particular time delay by tuning the wavelength of the tunable laser 110 to a wavelength that causes the demultiplexer 210 to couple the modulated optical signal to the corresponding waveguide 230-1 to 230-N.

The time delay may be selected depending on the application of the true time delay system 105. For example, for beamforming applications, the time delay may be selected based on a time delay to achieve a desired beam pattern.

The number of adjustable time delays depends on the number of waveguides 230-1 to 230-N between the demultiplexer 210 and the multiplexer 235 in the photonic circuit 130. For example, a photonic circuit comprising 32 waveguides 230-1 to 230-N of different lengths provides 32 selectable time delays, which translates into 5-bits of time delay selectivity. Fewer waveguides may be used to provide more space on the photonic circuit 130 for each waveguide 230-1 to 230-N.

In one aspect, the different wavelengths used for time delay selection may be spaced apart at an equivalent frequency spacing of 50 GHz or 100 GHz apart, respectively. Other spacings between wavelengths may also be used. In one example, the tunable laser 110 has a tunable wavelength within the range of 1520 to 1570 nm and the different wavelengths used for time delay selection are spaced apart at an equivalent frequency spacing of 50 GHz or 100 GHz apart. The different time delays may be spaced one nanosecond apart or other amount. Wavelength ranges may include 1.3 µm to 1.5 µm and time delay ranges may include ranges from microseconds to milliseconds.

The photonic circuit 130 may be fabricated on a single chip using planar circuit processing techniques. For example, an arrayed waveguide grating (AWG) comprising a plurality of planer waveguides may be fabricated on a single substrate to form the plurality of waveguides 230-1 to 230-N on a single substrate. In this example, the waveguides 230-1 to 230-N may be fabricated by depositing layers of glass on a substrate 208 (e.g., silicon oxide) using a flame hydrolysis process. Different layers of glass may be deposited on the substrate 208 to form the bottom cladding layer, core layer and upper cladding layer of the waveguides 230-1 to 230-N. The different layers of glass may be doped with different amounts of dopants (e.g., boron) to give the core layer a higher index of refraction than the bottom and upper cladding layers, and thus confine an optical signal within the waveguides. In the example shown in FIG. 2, the waveguides 230-1 to 230-N have serpentine patterns to provide different lengths for the waveguides in a compact area.

Figure 3:
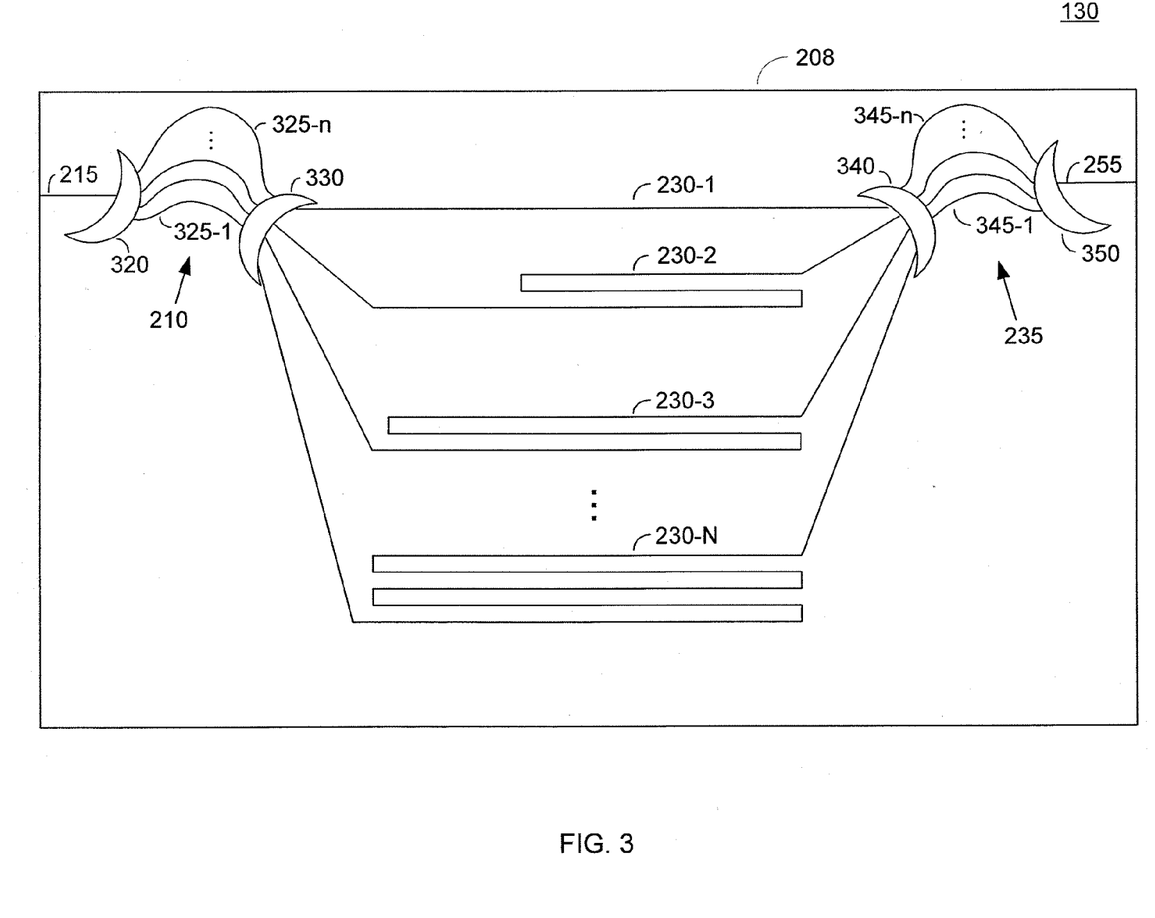
FIG. 3 is a diagram of a photonic circuit according to another aspect of the present disclosure.

FIG. 3 illustrates the photonic circuit 130 according to an aspect of the present disclosure, in which the demultiplexer 210 is implemented using an arrayed waveguide grating (AWG)-based demultiplexer. AWG-based demultiplexers are known in optical communication networks for demultiplexing multiple optical channels received on a single optical fiber, where each optical channel corresponds to a different wavelength.

In this aspect, the demultiplexer 210 comprises first and second diffraction regions 320 and 330, and a plurality of waveguides 325-1 to 325-n coupled between the first and second diffraction regions 320 and 330. The waveguides 325-1 to 325-n have different lengths, in which the lengths of adjacent waveguides 325-1 to 325-n differ by an integer multiple of a particular wavelength.

The first diffraction region 320 splits the modulated optical signal into a plurality of optical signals and couples each of the optical signals into one of the waveguides 325-1 to 325-N. The different lengths of the waveguides 325-1 to 325-n cause a phase shift between adjacent optical signals, where the phase shift depends on the wavelength of the optical carrier signal. As a result, the optical signals entering the second diffraction region 330 constructively interfere at a spatial position in the second diffraction region 330 that depends on the wavelength of the optical carrier signal. In this aspect, the inputs of the waveguides 330-1 to 330-N are coupled to the second diffraction region 330 at different spatial positions so that optical signals corresponding to a particular wavelength of the optical carrier signal are coupled into a particular waveguide 330-1 to 330-N. Thus, the demultiplexer 210 couples the modulated optical signal into a particular waveguide 230-1 to 230-N depending on the wavelength of the optical carrier signal. Since each waveguide 230-1 to 230-N corresponds to a particular time delay, the demultiplexer 210 provides time delay selectivity by tuning the wavelength of the tunable laser 115.

In the aspect shown in FIG. 3, the multiplexer 235 is implemented using an arrayed waveguide grating (AWG)-based multiplexer. In this aspect, the multiplexer 235 comprises first and second diffraction regions 340 and 350, and a plurality of waveguides 345-1 to 345-n of different lengths coupled between the first and second diffraction regions 340 and 350. The multiplexer 235 may have a similar structure as the demultiplexer 210 arranged in reverse order, as shown in FIG. 3. In this aspect, the multiplexer 235 performs the reverse optical processing of the demultiplexer 210 to couple an optical signal from any one of the plurality of waveguides 230-1 to 230-N into the output waveguide 255.

The demultiplexer 210 and the multiplexer 235 shown in FIG. 3 may be fabricated using the same planar circuit processing techniques used to fabricate the plurality of waveguides 230-1 to 230-N between the demultiplexer 210 and the multiplexer 235. For example, the demultiplexer 210 and the multiplexer 235 may be fabricated by depositing and patterning layers of glass on a substrate 208 (e.g., silicon oxide) to form the waveguides and diffraction regions of the demultiplexer 210 and multiplexer 235. Thus, the entire photonic circuit 130 can be integrated on a single chip to provide a photonic circuit 130 that is compact and light weight.

Figure 4:
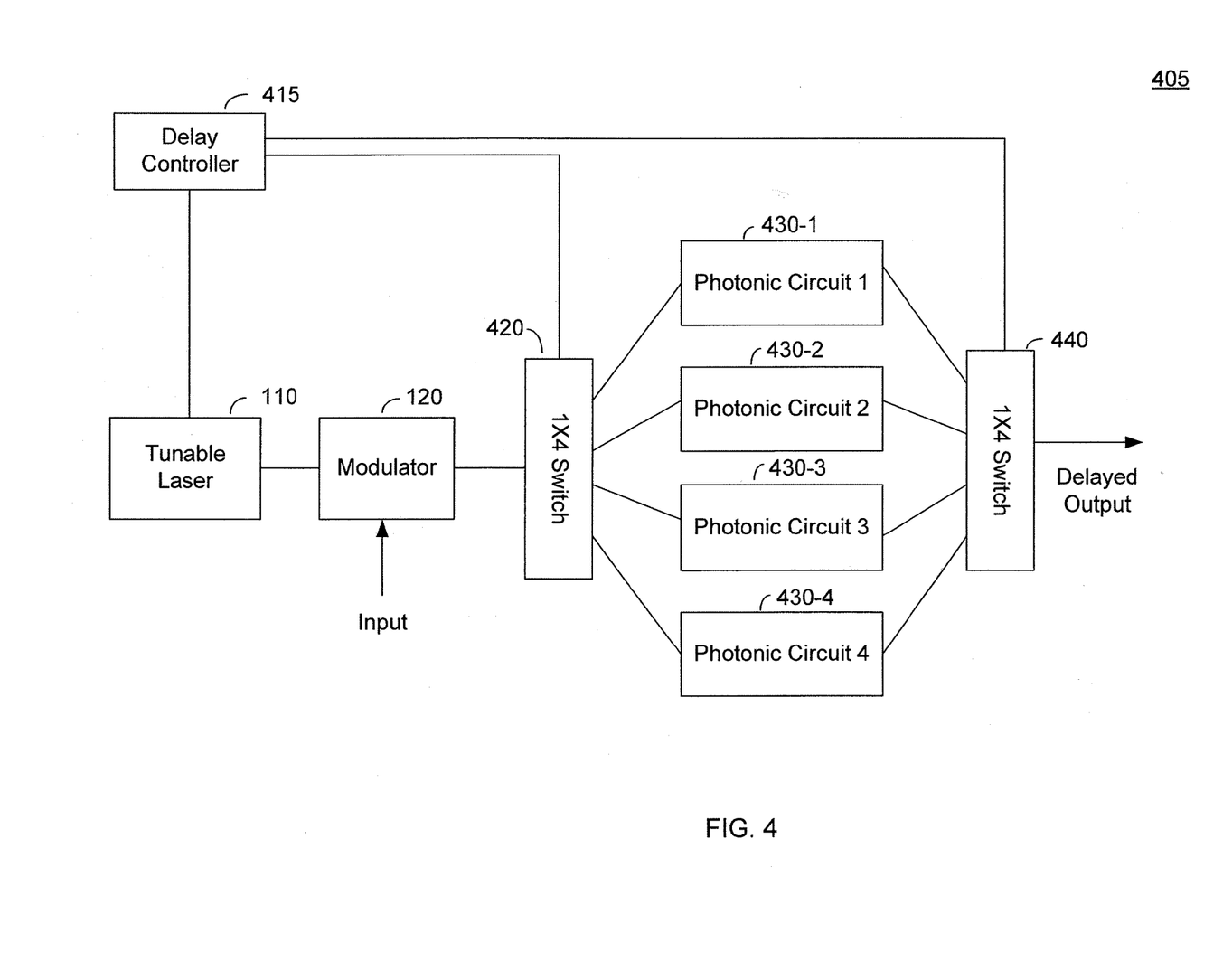
FIG. 4 is a diagram of a true time delay system comprising a plurality of photonic circuits according to an aspect of the disclosure.

FIG. 4 illustrates a true time delay system 405 according to an aspect of the present disclosure, in which photonic circuits 430-1 to 430-4 are used to provide additional selectable time delays. The true time delay system 405 comprises first and second switches 420 and 440, respectively, and a plurality of photonic circuits 430-1 to 430-4 coupled between the first and second switches 420 and 440. The first switch 420 couples the modulated optical signal from the optical modulator 120 to one of the photonic circuits 430-1 to 430-4 based on a control signal from the delay controller 415. The second switch 440 couples the output of one of the photonic circuits 430-1 to 430-4 to the output of the system 405 based on a control signal from the delay controller 415. Each switch may be implemented using a LiNbO3 switch and may be coupled to the photonic circuits 430-1 to 430-4 by optical fibers.

In this aspect, each photonic circuit 430-1 to 430-4 may be implemented using the photonic circuits shown in FIGS. 2 and 3 to provide a plurality of selectable time delays that can be selected by tuning the wavelength of the tunable laser 110. In one aspect, each photonic circuit 430-1 to 430-4 provides a different set of selectable time delays, in which a particular time delay of a photonic circuit is selected by tuning the tunable laser 110 to a corresponding wavelength. Thus, the total number of selectable time delays of the system 405 is an aggregate of all the selectable time delays of the photonic circuits 430-1 to 430-4.

In one aspect, the delay controller 415 selects a particular time delay of the system 405 by switching the first and second switches 420 and 440 to select the corresponding photonic circuit 430-1 to 430-4 and by tuning the tunable laser 110 to a particular wavelength to select the corresponding waveguide in the selected photonic circuit 430-1 to 430-4. For example, if the system comprises four photonic circuits 430-1 to 430-4 (2 bits of selectable time delay) and each photonic circuit 430-1 to 430-4 provides 32 selectable time delays (5 bits of selectable time delay), then the total number of selectable time delays of the system 405 is 128 (7 bits of selectable time delays). Although four photonic circuits 430-1 to 430-4 are shown in the example in FIG. 4, any number of photonic circuits may be used. For example, eight photonic circuits and 1×8 switches can be used to provide 3 bits of additional selectable time delays.

In one aspect, the system 405 includes a look-up-table (LUT) stored in memory (not shown). For each selectable time delay, the LUT includes an identity of the photonic circuit 430-1 to 430-4 corresponding to the time delay and the wavelength of the tunable laser 115 corresponding to the time delay. In this aspect, when a particular time delay is selected, the delay controller 405 looks up the corresponding photonic circuit 430-1 to 430-4 and wavelength in the LUT. The delay controller 405 then switches the first and second switches 420 and 440 to the corresponding photonic circuit 430-1 to 430-4 and tunes the wavelength of the tunable laser 115 to the corresponding wavelength. In this aspect, the photonic circuits 430-1 to 430-4 can be calibrated or measured in advance to construct the LUT linking wavelengths to time delays.

Figure 5:
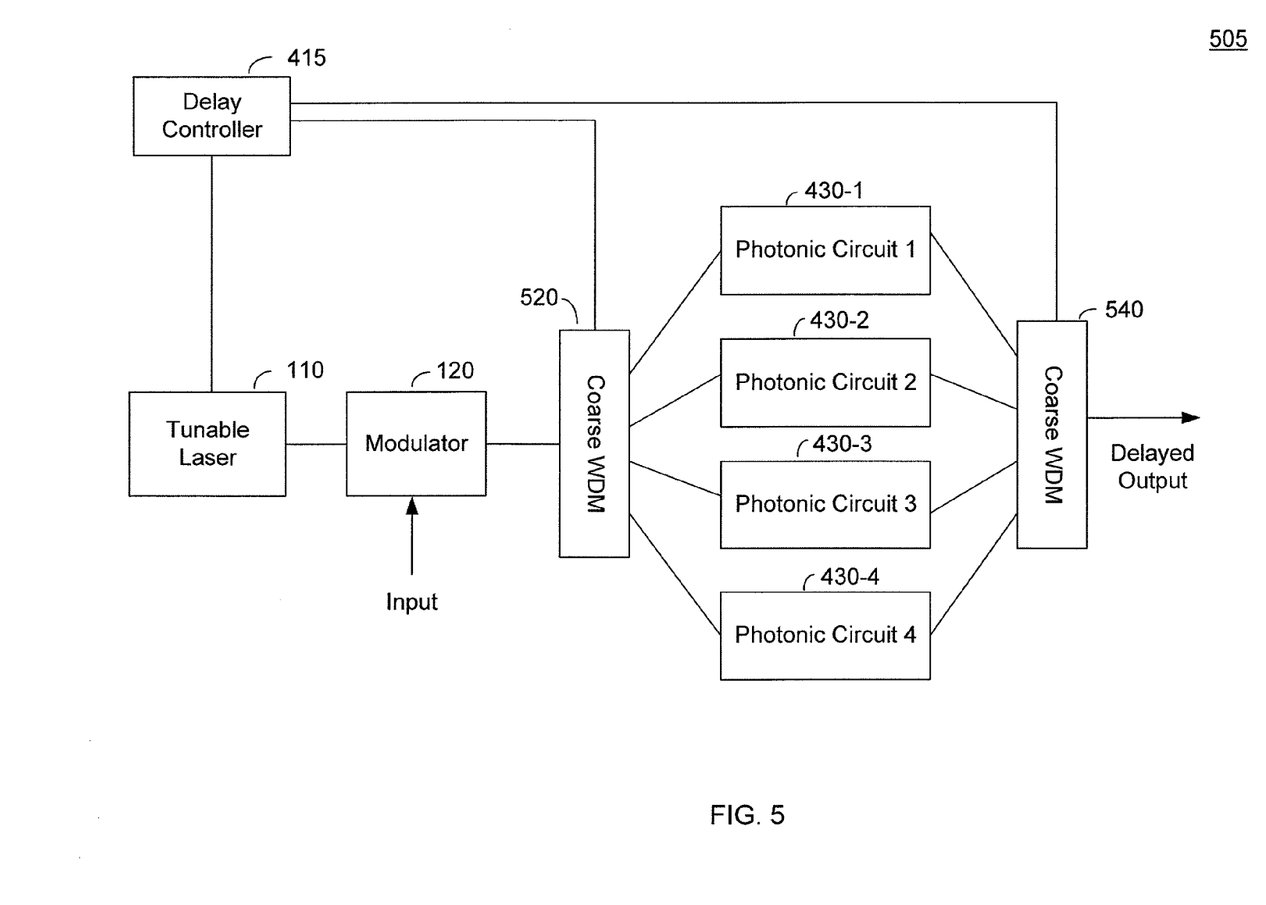
FIG. 5 is a diagram of a true time delay system comprising a plurality of photonic circuits according to another aspect of the disclosure.

FIG. 5 illustrates a true time delay system 505 according to an aspect of the present disclosure, in which the first and second switches 420 and 440 in FIG. 4 are replaced with first and second coarse wave division multiplexing (WDM) devices 520 and 540, respectively. The first coarse WDM device 520 demultiplexes the wavelengths of the system 505 into different groups of wavelengths, where each group of wavelengths is coupled into one of the photonic circuits 403-1 to 430-4. For example, the first coarse WDM device 520 couples a first group of wavelengths into the first photonic circuit 430-1, a second group of wavelength into the second photonic circuit 430-2, and so on. In another example, the wavelengths of the system 505 correspond to an optical C or L frequency band, in which each group of wavelengths corresponds to a different portion of the optical C or L frequency band.

Each photonic circuit 430-1 to 430-4 provides a plurality of selectable time delays that can be selected by tuning the tunable laser 110 to a particular wavelength within the corresponding group of wavelengths. For example, a particular delay of the first photonic circuit 430-1 can be selected by tuning the tunable laser 110 to a particular wavelength within the first group of wavelengths. The second coarse WDM devices 540 couples signals from the different photonic circuits 430-1 to 430-4 to the output of the system 405.

In this aspect, the delay controller 115 selects a particular time delay by tuning the tunable laser 110 to the corresponding wavelength. The first coarse WDM device 520 couples the modulated optical signal into the corresponding one of the photonic circuits 430-1 to 430-4 based on the wavelength of the optical carrier signal using coarse wavelength demultiplexing. The corresponding photonic circuit 430-1 to 430-4 then applies the selected time delay by coupling the modulated optical signal to the corresponding waveguide in the photonic circuit based on the wavelength of the optical carrier signal.

Figure 6:
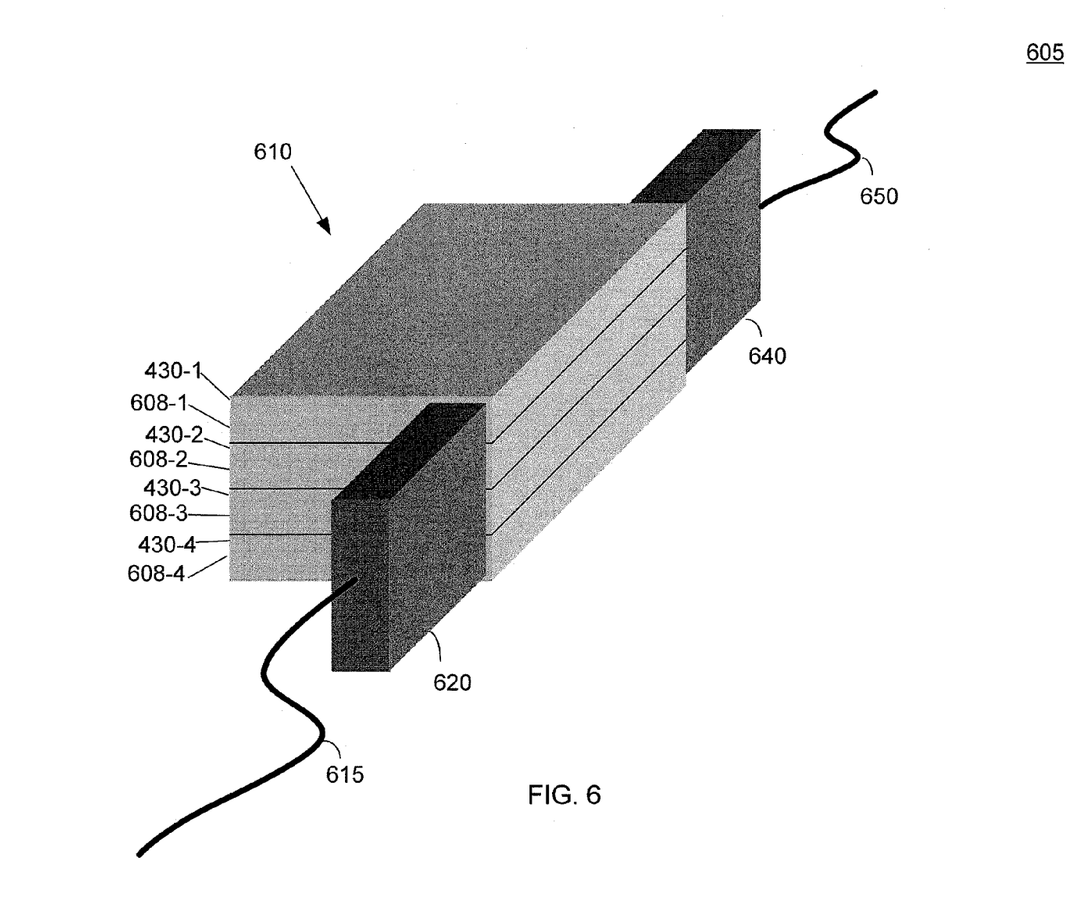
FIG. 6 illustrates a stack of photonic circuits according to an aspect of the disclosure.

FIG. 6 illustrates a true time delay system 605 comprising a plurality of photonic circuits 430-1 to 430-4 according to an aspect of the present disclosure. Each photonic circuit 430-1 to 430-4 may be implemented using the photonic circuits shown in FIGS. 2 and 3. In this aspect, the photonic circuits 430-1 to 430-4 are fabricated on separate substrate layers 608-1 to 608-4 (e.g., silicon oxide), which are stacked on top one another forming a multi-layer stack 610. The system 605 also comprises a first switch 620 to selectively couple the modulated optical signal from an input optical fiber 615 to one of the photonic circuits 430-1 to 430-4 based on a control signal from the delay controller 115. The system 605 also comprises a second switch 640 to selectively couple one of the photonic circuits 430-1 to 430-4 to an output optical fiber 650 of the system 605. The switches may be replaced with coarse WDMs.

Figure 7A:
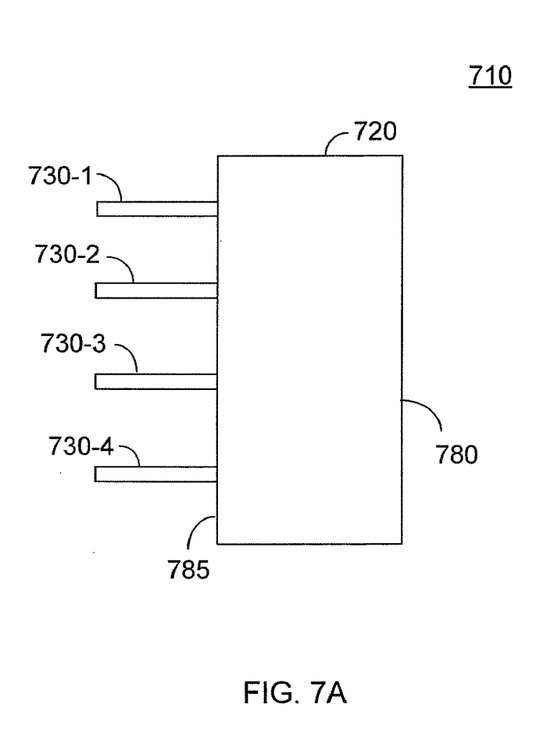
FIGS. 7A and 7B illustrate a side view and a front view, respectively, of a coupler according to an aspect of the disclosure.
Figure 7B:
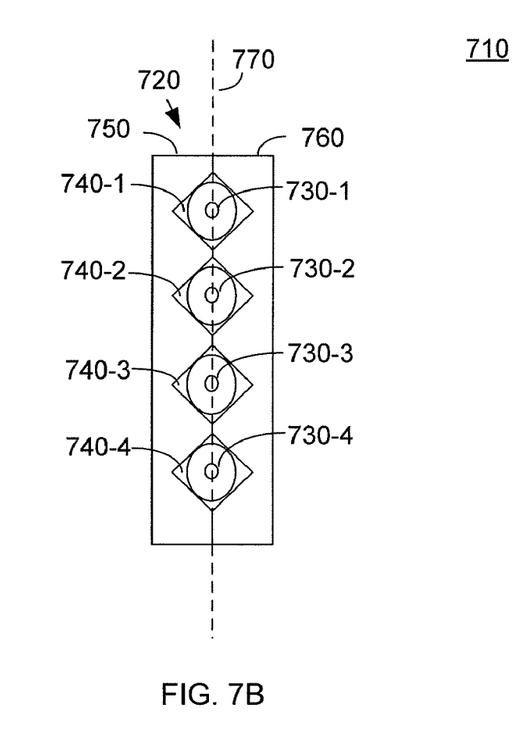

FIGS. 7A and 7B illustrate an example of a coupler 710 that can be used to couple a switch or WDM device to the different photonic circuits 430-1 to 430-4 in the multilayer stack 610. FIG. 7A shows a side view of the coupler 710 and FIG. 7B shows a front view of the coupler 710. The coupler 710 comprises four optical fibers 730-1 to 730-4, where each optical fiber 730-1 to 730-4 couples a port of the switch or WDM device (not shown in FIGS. 7A and 7B) to one of the photonic circuits 430-1 to 430-4. The coupler 710 may have a different number of optical fibers depending on the number of photonic circuits. The coupler 710 further comprises a V-block 720 comprising a plurality of holes 740-1 to 740-4 extending through the V-block 720. In one aspect, the V-block 720 is fabricated by forming V-groves in a first block 750, forming corresponding V-grooves in a second block 760 and attaching the first and second blocks 750 and 760 together to form the V-block 720. The blocks may comprise silicon or other materials.

Each optical fiber 730-1 to 730-4 is placed in one of the holes 740-1 to 740-4 in the V-block 720. This may be done, for example, by placing the optical fibers 730-1 to 730-4 into the V-grooves of one of the blocks 750 and 760 and then attaching the blocks 750 to 760 to form the V-block 720. In one aspect, the holes 740-1 to 740-4 are spaced apart along a vertical axis 770 and the V-grooves are dimensioned so that each optical fiber 730-1 to 730-4 aligns with the input/output waveguide of one of the photonic circuits 430-1 to 430-4. Front ends of the optical fibers 730-1 to 730-4 are optically polished and flush with a front planar surface 780 of the V-block 720. The other ends of the optical fibers 730-1 to 730-4 extend out a back 785 of the V-block 720 where they may be coupled to output/input ports of a switch or WDM device to be coupled to the photonic circuits 430-1 to 430-4 of the multi-layer stack 610.

Figure 8:
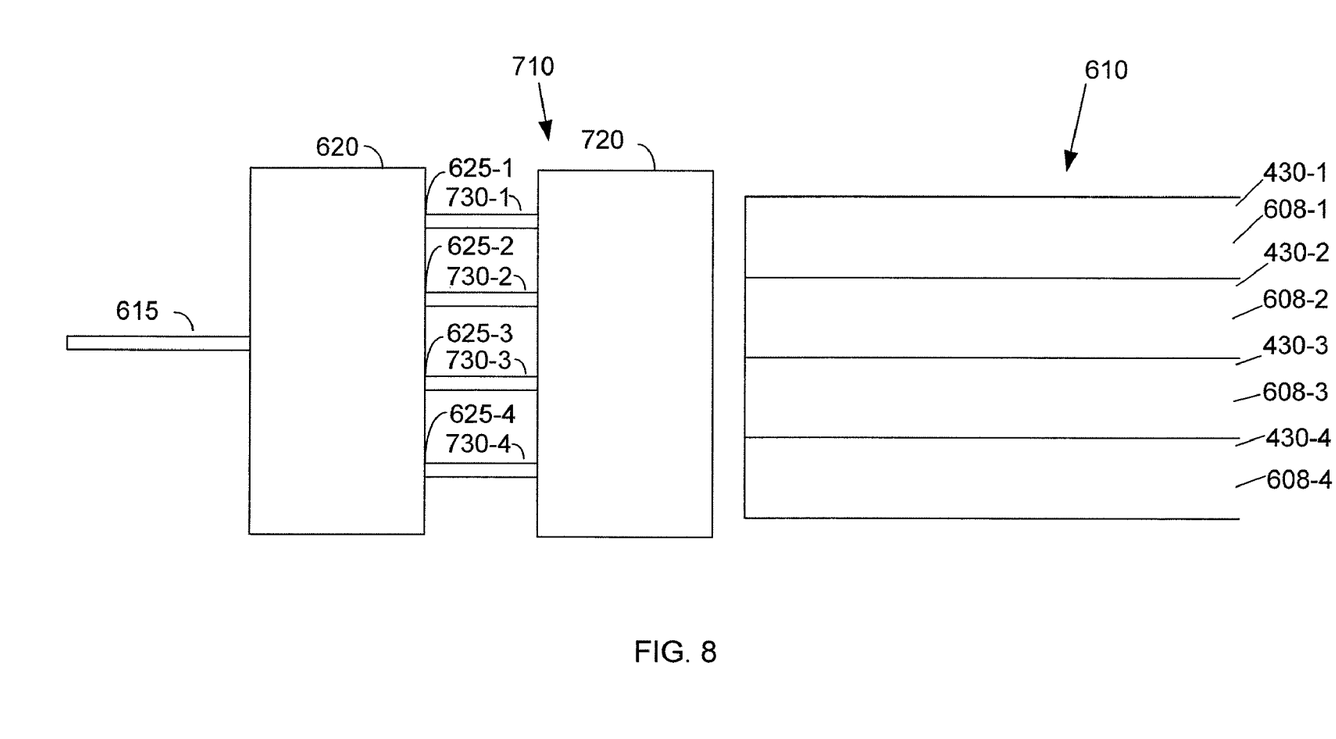
FIG. 8 illustrates an example of a switch coupled to stack of photonic circuits according to an aspect of the disclosure.

FIG. 8 illustrates an example in which the first switch 620 is coupled to the photonic circuits 430-1 to 430-4 by the coupler 710 illustrated in FIGS. 7A and 7B. In this example, the first switch 620 has four output ports 625-1 to 625-4, one for each photonic circuit 430-1 to 430-4. Each output port 625-1 to 625-4 is coupled to a corresponding one of the optical fibers 740-1 to 740-4. To optically couple the front ends of the optical fibers 730-1 to 730-4 to the corresponding photonic circuits 430-1 to 430-4, the font planar surface 780 of the V-block 720 is orientated perpendicular to the multi-layer stack 610. The V-block 720 is then positioned adjacent to the multi-layer stack 608 such that the front end of each optical fiber 730-1 to 730-4 is aligned with the input waveguide of the corresponding photonic circuit 430-1 to 430-4. The V-block 720 is spaced close enough to the photonic circuits to couple optical signals between the optical fibers 730-1 to 730-4 and the input waveguides of the photonic circuits 430-1 to 430-4. The V-block 720 may be placed approximately 1.0 μm to 15 μm from the photonic circuits 430-1 to 430-4. An adhesive, such as a UV-curable adhesive, can be used to hold the V-block 720 close to the photonic circuits 430-1 to 430-4 and maintain the close proximity.

The second switch 640 can also be coupled to the photonic circuits 430-1 to 430-4 using the coupler 710. In this case, the coupler 710 couples the output waveguides of the photonic circuits 430-1 to 430-4 to the input ports of the second switch 640. Also, the coupler 710 can be used to couple coarse WDM devices to the photonic circuits 430-1 to 430-4 for the case where WDM devices are used instead of switches.

The true time delay systems and photonic circuits according to embodiments of the present disclosure can be used in a variety of applications that require true time delay control. For example, the true time delays systems may be used to adjust and steer the beam of a phased array antenna. In this example, the time delays for the antenna elements of the phased array antenna can be individually controlled to produce a desired beam using a plurality of true time delay systems (one for each antenna element) according aspects of the present disclosure. In another example, the true time delay systems can be used in conjunction with optical splitters and combiners to form the basis of a finite impulse response RF filter.

Figure 9:
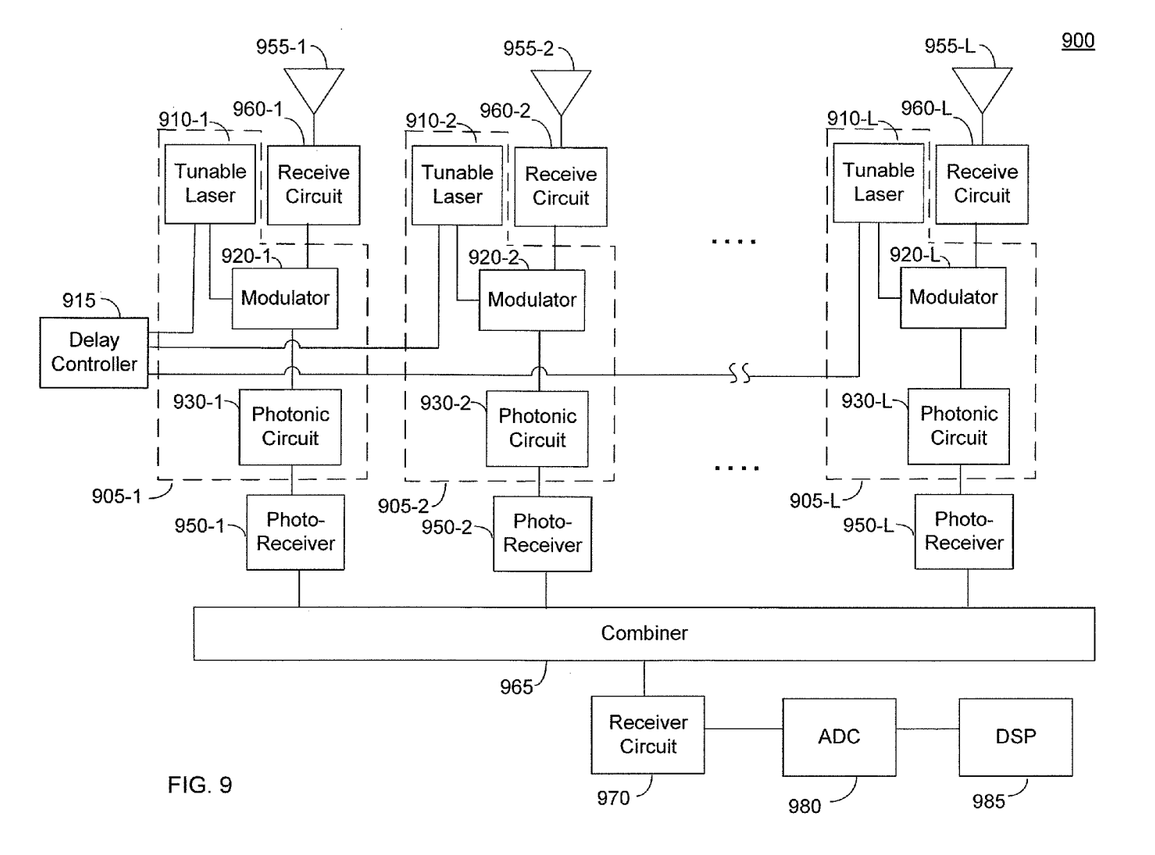
FIG. 9 is a diagram of a phase array receiver according to another aspect of the disclosure.

FIG. 9 is a diagram of a phased array receiver 900 comprising a plurality of true time delay systems 905-1 to 905-L according to an aspect of the disclosure. The phase array receiver 900 further comprises a plurality of spaced-apart antenna elements 955-1 to 955-L forming an antenna array, a plurality of receive circuits 960-1 to 960-L, a plurality of true time delay systems 905-1 to 905-L, a plurality of photo-receivers 950-1 to 950-L, a delay controller 915, and a signal combiner 965.

Each antenna element 955-1 to 955-L is configured to receive an RF signal and each receive circuit 960-1 to 960-L is configured to process the received signal from the respective antenna element. The process performed by each receive circuit 960-1 to 960-L may include low noise amplification, filtering, frequency conversion and/or other operations. Each true time delay 905-1 to 905-L is configured to apply a time delay to the respective received signal. Each photo-receiver 950-1 to 950-L is configured to convert a time delayed optical signal from the respective true time delay system 905-1 to 905-L into an electrical signal representing the time delayed received signal. The signal combiner 965 is configured to combine the signals from the photo-receivers 950-1 to 950-L into a combined signal, which is further processed to recover information in the received signals, as discussed further below.

The true time delay systems 905-1 to 905-L can apply different time delays to their respective received signals to form a desired receive beam. In one aspect, the delay controller 915 controls the time delay of each true time delay system 905-1 to 905-L to achieve a desired receive beam. Further, the delay controller 915 can vary the time delays of the true time delay systems 905-1 to 905-L to dynamically steer the receive beam. In this aspect, the delay controller 915 may receive a time delay command for each antenna element 955-1 to 955-L from a beamformer controller (not shown) and adjust the time delays of the true time delay systems 905-1 to 905-L based on the received commands.

In one aspect, each of the true time delay systems 905-1 to 905-L comprises a tunable laser 910-1 to 910-L, an optical modular 920-1 to 920-L, and a photonic circuit 930-1 to 930-L. In each true time delay system 905-1 to 905-L, the tunable laser 910-1 to 910-L is configured to produce an optical carrier signal having a tunable wavelength, the optical modulator 920-1 to 920-L is configured to modulate the received signal onto the optical carrier signal producing a modulated optical signal, and the photonic circuit 930-1 to 930-L is configured to delay the modulated optical signal by one of a plurality of different time delays depending on the wavelength of the optical carrier signal. The photonic circuit 930-1 to 930-L may be implemented using the photonic circuits shown in FIGS. 2 and 3. In this aspect, the delay controller 915 is configured to control the delay of each true time delay system 905-1 to 905-L by adjusting the wavelength of the respective tunable laser 910 to a wavelength corresponding to a desired time delay.

Although one photonic circuit 930-1 to 930-L is shown in each true time delay system 905-1 to 905-L in the example in FIG. 9 for ease of illustration, each true time delay system 905-1 to 905-L may comprise a plurality of photonic circuits to provide additional selectable time delays for each true time delay system 905-1 to 905-L. For example, each true time delay system 905-1 to 905-L may be implemented using the true time delays circuits shown in FIGS. 4 and 5, in which switches or WDM devices are used to select a photonic circuit corresponding to a desired time delay. In this example, the delay controller 915 may also control switches (not shown in FIG. 9) in each true time delay system 905-1 to 9050-L to select a photonic circuit corresponding to a desired time delay.

In one aspect, the phased array receiver 900 further comprises a receiver circuit 970, an analog-to-digital converter (ADC) 980 and a digital signal processor (DSP) 985. The receiver circuit 970 is configured to process the combined signal from the signal combiner 965. The process performed by receiver circuit 970 may include filtering, frequency conversion and/or other operations. The ADC 980 is configured to the convert the signal from the receiver circuit 970 into a digital signal for digital signal processing. The DSP 985 is configured to digitally process the digital signal from the ADC 980, for example, to recover information in the received signals.

The phased array receiver 900 in FIG. 9 illustrates an example of one application of the true time delay systems according to aspects of the disclosure. The true time delay systems may be used in any application requiring beamforming. Applications include controlling the receive and/or transmit direction of phased arrayed antennas, changing the direction of a synthetic-aperture radar to track a moving target, etc. Beamforming systems may be used in mobile wireless (cellular) and other wireless communication systems, reconnaissance receivers, etc.

The description of the invention is provided to enable any person skilled in the art to practice the various embodiments described herein. While the present invention has been particularly described with reference to the various figures and embodiments, it should be understood that these are for illustration purposes only and should not be taken as limiting the scope of the invention.

There may be many other ways to implement the invention. Various functions and elements described herein may be partitioned differently from those shown without departing from the sprit and scope of the invention. Various modifications to these embodiments will be readily apparent to those skilled in the art, and generic principles defined herein may be applied to other embodiments. Thus, many changes and modifications may be made to the invention, by one having ordinary skill in the art, without departing from the spirit and scope of the invention.

For example, those skilled in the art will appreciate that the delay controllers described in connection with the embodiments disclosed herein may be implemented or performed with general purpose processors, a digital signal processors (DSPs), application specific integrated circuit (ASICs), field programmable gate array (FPGAs), logic programmable devices, discrete hardware components, or any combination thereof. The software may be stored in memory or any computer-readable storage medium known in the art.

A reference to an element in the singular is not intended to mean "one and only one" unless specifically stated, but rather "one or more." The term "some" refers to one or more. Underlined and/or italicized headings and subheadings are used for convenience only, do not limit the invention, and are not referred to in connection with the interpretation of the description of the invention. All structural and functional equivalents to the elements of the various embodiments described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

What is claimed is:

1. A time delay system, comprising:
a tunable laser configured to produce a single optical carrier signal having a tunable wavelength;
an optical modulator configured to modulate an input signal onto the single optical carrier signal to produce a modulated optical signal;
a first photonic circuit configured to delay the modulated optical signal by one of a first plurality of different time delays depending on the wavelength of the single optical carrier signal;
a second photonic circuit configured to delay the modulated optical signal by one of a second plurality of different time delays depending on the wavelength of the single optical carrier signal, wherein the second plurality of different time delays is different from the first plurality of different time delays;
a switch configured to selectively couple the modulated optical signal to one of the first and second photonic circuits; and
a delay controller configured to tune the wavelength of the single optical carrier signal of the tunable laser and to send a control signal to the switch based on a selected one of the first and second plurality of time delays.

2. The system of claim 1, wherein the first photonic circuit comprises:
a plurality of waveguides, each of the plurality of waveguides having a different length corresponding to one of the first plurality of time delays; and
a demultiplexer configured to couple the modulated optical signal into one of the plurality of waveguides depending on the wavelength of the single optical carrier signal.

3. The system of claim 2, wherein the plurality of waveguides and the demultiplexer are integrated on a single substrate.

4. The system of claim 2, wherein the demultiplexer comprises:
first and second diffraction regions; and
a second plurality of waveguides between the first and second diffraction regions, each of the second plurality of waveguides having a different length.

5. The system of claim 2, further comprising a multiplexer configured to couple each of the plurality of waveguides to an output waveguide.

6. The system of claim 5, wherein the plurality of waveguides, demultiplexer and multiplexer are integrated on a single substrate.

7. The system of claim 2, wherein the plurality of waveguides comprises a plurality of planar waveguides disposed on a single substrate.

8. The system of claim 1, further comprising a photoreceiver configured to convert the delayed modulated optical signal from the selected one of the photonic circuits into an electrical signal.

9. A time delay system, comprising:
a tunable laser configured to produce a single optical carrier signal having a tunable wavelength;
an optical modulator configured to modulate an input signal onto the single optical carrier signal to produce a modulated optical signal;
first and second photonic circuits, wherein each of the first and second photonic circuits comprises:
a plurality of waveguides, each of the plurality of waveguides having a different length corresponding to one of a plurality of different time delays;

a demultiplexer configured to couple the modulated optical signal into one of the plurality of waveguides depending on a wavelength of the single optical signal; and a multiplexer configured to couple each of the plurality of waveguides to an output waveguide;

a coarse wave division multiplexing (WDM) device disposed between the tunable laser and the first and second photonic circuits, the coarse WDM configured to couple the modulated optical signal to one of the first and second photonic circuits depending on the wavelength of the single optical carrier, wherein the plurality of time delays for the first photonic circuit is different from the plurality of time delays for the second photonic circuit; and a delay controller configured to tune the wavelength of the single optical carrier signal of the tunable laser based on both a selected one of the first and second photonic circuits and a selected one of the plurality of time delays in the selected one of the first and second photonic circuits.

10. The system of claim 9, wherein, the plurality of waveguides, the demultiplexer and the multiplexer in each of the first and second photonic circuits are integrated on a single substrate.

11. The system of claim 9, wherein the demultiplexer in each of the first and second photonic circuits comprises:
first and second diffraction regions; and
a second plurality of waveguides between the first and second diffraction regions, each of the second plurality of waveguides having a different length.

12. The system of claim 9, wherein the plurality of waveguides in each of the first and second photonic circuits comprises a plurality of planar waveguides disposed on a single substrate.

13. The system of claim 12, wherein one or more of the plurality of waveguides has a serpentine pattern.

14. A method for time delaying an input signal, comprising:

outputting a single optical earner signal from a tunable laser;

modulating the input signal onto the single optical carrier signal to produce a modulated optical signal;

coupling, with a switch, the modulated optical signal to one of a first photonic circuit and a second photonic circuit, wherein the first photonic circuit is configured to delay the modulated optical signal by one of a first plurality of different time delays depending on a wavelength of the single optical carrier signal, the second photonic circuit is configured to delay the modulated optical signal by one of a second plurality of different time delays depending on the wavelength of the single optical carrier signal, and the second plurality of different time delays is different from the first plurality of different time delays; and tuning the wavelength of the single optical carrier signal based on a selected one of the first and second plurality of time delays; and sending a control signal to the switch to control the coupling of the modulated optical signal to one of the first and second photonic circuits based on the selected one of the first and second plurality of time delays.

* * * * *